US006886861B2

(12) United States Patent
Marsala et al.

(10) Patent No.: US 6,886,861 B2
(45) Date of Patent: May 3, 2005

(54) TRUNK MOUNTED FUEL TANK ASSEMBLY

(75) Inventors: Vincent J. Marsala, Auburn Hills, MI (US); Gregory E. Rich, Chesterfield, MI (US)

(73) Assignee: General Motors Corporation, Detroit, MI (US)

( * ) Notice: Subject to any disclaimer, the term of this patent is extended or adjusted under 35 U.S.C. 154(b) by 15 days.

(21) Appl. No.: 10/368,981

(22) Filed: Feb. 19, 2003

(65) Prior Publication Data

US 2004/0160052 A1 Aug. 19, 2004

(51) Int. Cl.[7] .................................................. B60P 3/22
(52) U.S. Cl. ..................................... 280/834; 280/830
(58) Field of Search ................................ 280/830, 833, 280/834; 296/203.04, 193.08, 187.11; 403/348, 350–353; 411/104, 107, 84, 85, 174, 175

(56) References Cited

U.S. PATENT DOCUMENTS

| | | | | |
|---|---|---|---|---|
| 1,039,098 A | * | 9/1912 | Coffin | 220/564 |
| 3,332,182 A | * | 7/1967 | Mark | 52/127.12 |
| 3,698,597 A | * | 10/1972 | Burke | 220/86.2 |
| 3,737,127 A | * | 6/1973 | Maloney et al. | 248/48.2 |
| 3,986,318 A | * | 10/1976 | McConnell | 403/384 |
| 4,135,724 A | * | 1/1979 | Larsen | 280/830 |
| 5,056,492 A | * | 10/1991 | Banse | 123/509 |
| 5,186,324 A | * | 2/1993 | Brandon, Jr. | 206/223 |
| 5,195,780 A | * | 3/1993 | Inoue et al. | 280/834 |
| 5,405,167 A | * | 4/1995 | Lee | 280/830 |
| 5,542,706 A | * | 8/1996 | Kubly | 280/833 |
| 5,673,940 A | * | 10/1997 | Gaisford et al. | 280/834 |
| 5,794,979 A | * | 8/1998 | Kasuga et al. | 280/834 |
| 5,992,885 A | * | 11/1999 | Fukagawa et al. | 280/830 |
| 5,997,040 A | * | 12/1999 | Fukagawa et al. | 280/834 |
| 6,042,071 A | * | 3/2000 | Watanabe et al. | 248/313 |
| 6,378,823 B1 | * | 4/2002 | Edholm | 248/219.4 |
| 6,402,198 B2 | * | 6/2002 | Gollungberg | 280/830 |
| 6,616,994 B2 | * | 9/2003 | Van Schaftingen et al. | 428/35.7 |
| 6,698,475 B2 | * | 3/2004 | Schaefer et al. | 141/325 |

* cited by examiner

*Primary Examiner*—Lesley D. Morris
*Assistant Examiner*—L. Lum
(74) *Attorney, Agent, or Firm*—Laura C. Hargitt

(57) ABSTRACT

A trunk mounted fuel tank assembly including a cradle, a fuel tank, and at least one retention strap is disclosed. The cradle includes a back portion and bottom portion with a fuel feed passage that is placed over a surface of a trunk. The fuel tank includes a fuel line that is placed about the back portion and bottom portion of the cradle. The fuel line extends through the fuel feed passage and a passage in the surface of the trunk. The at least one retention strap includes a first leg and a second leg that is placed over a top portion of the fuel tank for retaining the fuel tank to the cradle.

23 Claims, 3 Drawing Sheets

TRUNK MOUNTED FUEL TANK ASSEMBLY

BACKGROUND OF THE INVENTION

Field of the Invention

The present invention relates to fuel tank assemblies, and in particular to a fuel tank assembly mounted in the trunk of a vehicle.

Typically, vehicular fuel tanks may be mounted in a body-on-frame or underbody configuration. In either configuration, operator access to the fuel tank for installation or service is typically not hindered. Alternatively, when space for mounting the fuel tank in the above configurations is unavailable, fuel tanks may be mounted in the trunk of a vehicle.

However, when fuel tanks are mounted in the trunk of the vehicle, operator access for installation or service tends to be limited as a result of the available space restrictions imposed by the design of the trunk. Even further, during a "blind installation" (i.e. when the fuel tank obstructs the operator's view) of a conventional trunk-mounted fuel tank, the operator may not be able to rigidly fasten and retain the fuel tank to an underlying surface of the trunk.

Therefore, a need exists for a device that maintains and retains a trunk mounted fuel tank in a position that does not hinder operator access for installation and service.

SUMMARY OF THE INVENTION

In a first embodiment of the invention, a trunk mounted fuel tank assembly is described. The trunk mounted fuel tank assembly comprises a cradle, a fuel tank, and at least one retention strap. The cradle includes a back portion and bottom portion with a fuel feed passage that is placed over a surface of a trunk. The fuel tank includes a fuel line. The fuel tank is placed about the back portion and bottom portion of the cradle. The fuel line extends through the fuel feed passage and a passage in the surface of the trunk. The at least one retention strap including a first leg and a second leg is placed over a top portion of the fuel tank for retaining the fuel tank to the cradle.

Another embodiment of the trunk mounted fuel tank assembly includes a cradle comprising a first flange with a key passage and an integral wedge portion that extends from the back portion of the cradle. The first flange permits fastening of the cradle to the surface of the trunk by a welded stud including a key portion and a wedge-receiving portion that extends from the surface of the trunk. The wedge-receiving portion guides the stud about a channel of the key passage that extends through the wedge portion. The cradle includes a second flange that extends from the bottom portion of the cradle and includes a first fastener passage. The fuel tank also includes an enclosure comprising a blow-molded high-density polyethylene that conforms to and encapsulates an outer surface of the fuel tank. The enclosure terminates near a fuel line interface that extends through the surface of the trunk and out to the underbody of the vehicle. The second leg of the at least one retention strap is connected to the back portion of the cradle. The first leg of the at least one retention strap includes a second fastener passage that permits a bolt to extend through the first and second fastener passage for connecting the at least one retention strap to the cradle and surface of the trunk. The cradle and at least one retention strap comprises stamped steel.

Another embodiment of the trunk mounted fuel tank assembly comprises means for maintaining a fuel tank, means for retaining the fuel tank, blind installation means, fuel tank rigidifying and liquid loss drainage means, and fuel line protection means.

Various additional aspects and advantages of this invention will become apparent to those skilled in the art from the following detailed description of the preferred embodiment, when read in light of the accompanying drawings.

DESCRIPTION OF THE PREFERRED EMBODIMENTS

Figure 1:
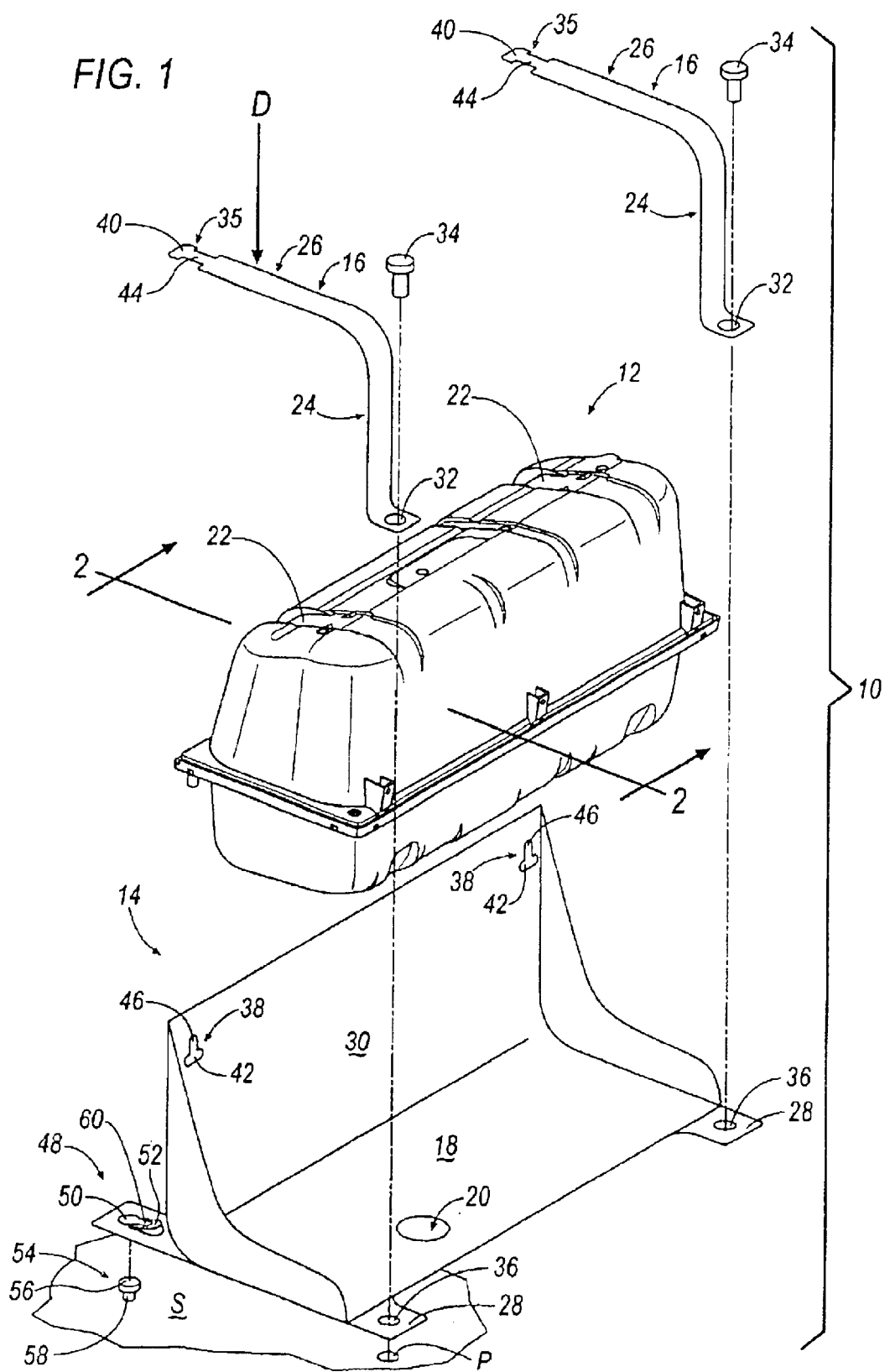
FIG. 1 is an exploded view of a trunk mounted fuel tank assembly according to one embodiment of the invention.

Referring to FIG. 1, a trunk mounted fuel tank assembly, which is shown generally at 10, comprises at least a fuel tank 12, means for maintaining the fuel tank 12, such as a cradle 14, and means for retaining the fuel tank 12, such as at least one retention strap 16. The cradle 14 and retention straps 16 may comprise any desirable rigid material, such as steel, that is stamped into any desirable configuration that maintains and retains the fuel tank 12. Essentially, as explained in further detail below, the fuel tank assembly 10 provides isolation of the fuel tank 12, a robust fuel line interface, and promotes fuel drainage during a vehicular crash event, while also lending support and providing serviceability to the fuel tank 12 and other associated components.

The fuel tank assembly 10 resides on a surface, which is generally indicated at S, in the trunk of a vehicle. The surface, S, may be any desirable surface in the trunk of the vehicle such as, for example, a surface located forward or behind the rear axle of the vehicle. As illustrated, the fuel tank 12 may be anchored to the surface, S, by first placing the fuel tank 12 over a bottom portion 18 of the cradle 14 that includes a fuel feed passage 20. Once the fuel tank 12 is properly positioned about the cradle 14, the retention straps 16 are placed over the a top portion 22 of the fuel tank 10 such that a first leg 24 and a second leg 26 of each retention strap 16 is connected with a first flange portion 28 and a back portion 30 of the cradle 14, respectively.

Each first leg 24 includes a first fastener passage 32 for receiving a fastener 34, such as a bolt or screw. Once the fastener 34 is passed through the first fastener passage 32, the fastener 34 is then passed through a second fastener passage 36 that is located about the first flange portion 28 that adjacently overlies a surface passage, P, of the surface, S, so that the fastener 34 may secure the retention strap 16 to the cradle 14 and the cradle 14 to frame rails (not shown) below the surface, S.

Each second leg 26 of the retention straps 16 may be further defined to include any desirable shape, such as a t-shaped section 35, that matingly cooperates with a second leg reception passage 38 located on the back portion 30. Accordingly, as illustrated, a head portion 40 of the t-shaped section 35 is inserted through a mouth 42 of the reception passage 38. Then, a neck portion 44 of the t-shaped section 35 is passed through a throat portion 46 of the reception passage 38. The neck portion 44 and throat portion 46 are designed to have a smaller width than the head portion 40 and mouth portion 42 so that the t-shaped section 35 of the second leg 26 may be removeably attached from the back portion 30 of the cradle 14 during a service or installation procedure in order to gain access to the fuel tank 12. As illustrated, each second leg 26 may be detached from the back portion 30 by applying pressure in the direction as illustrated by the arrow, D, near the neck portion 44 of the t-shaped section 35.

The back portion 30 of the cradle 14 may also be secured to the surface, S, by fasteners 34 that pass through a second flange portion 48; however, the second flange portions 48 may face a trunk wall (not shown), resulting in a blind installation of the cradle 14. Therefore, in order to accommodate a blind installation of the cradle 14 prior to fastening the retention straps 16, the second flange portions 48 may also comprise blind installation means, such as a key passage 50 with an integral wedge portion 52.

In this embodiment of the invention, the second flange portion 48 is designed to receive a protrusion, such as a welded stud 54 that extends from the surface, S, of the trunk. The stud 54 may include a key portion 56 and a wedge-receiving portion 58. Essentially, the key portion 56 is designed to matingly pass through the key passage 50 during a blind installation of the cradle 14, and the wedge-receiving portion 58 is designed to guide the stud 54 about a channel 60 of the key passage 50 that extends through the wedge portion 52.

In operation, the second flange portion 48 permits the anchoring of the cradle 14 to the surface, S, and once the stud 54 is received by the flange portion 48, a "preload" is created that rigidly retains the cradle 14 to the surface, S, as a result of the plastic deformation of the wedge portion 52 by the stud 54. The overall combination of the stud 54 and fasteners 34 with the cradle 14 and retention straps 16 lends stiffness and robustivity to the fuel tank 12 while also providing a fuel tank assembly 10 that provides structure and isolation of the fuel tank 12 during a crash event.

Figure 2:
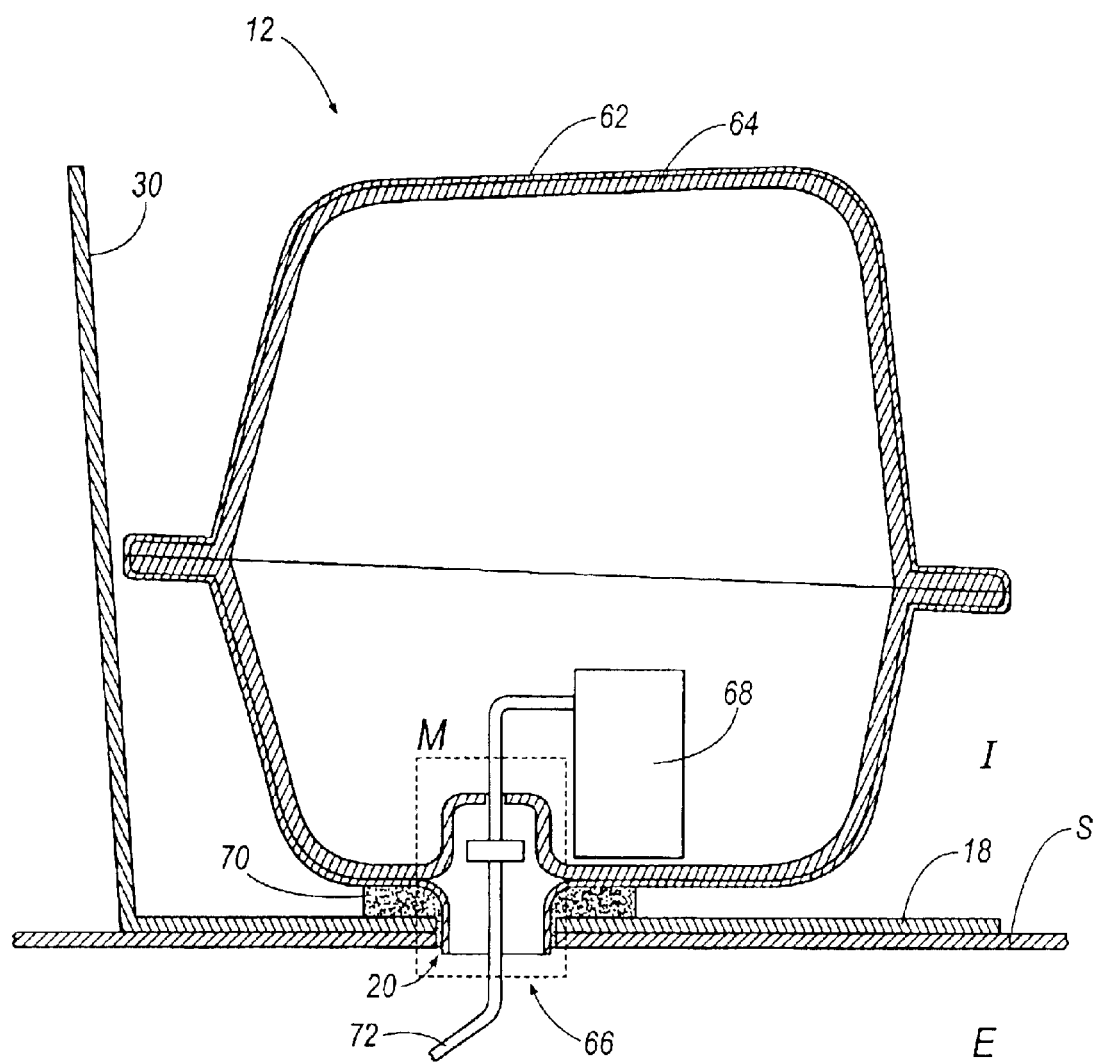
FIG. 2 is a cross-sectional view of the fuel tank assembly according to FIG. 1.

Referring now to FIG. 2, the fuel tank 12 may also comprise fuel tank rigidifying and liquid loss drainage means, such as an enclosure 62, that encapsulates an outer surface of the fuel tank 12, which is shown generally at 64. The enclosure 62 may comprise any desirable fire-retardant or plastic material, such as a high-density polyethylene, and may be blow-molded so that it may conform to the outer surface 64. Essentially, the enclosure 62 provides a rigid "clam shell" shield that protects the fuel tank 12 and channels potential liquid loss during a crash event from the vehicle interior, I, to the vehicle exterior, E. Essentially, the enclosure 62 is illustrated to terminate near a fuel line interface 66 that extends through the surface, S, and out to the underbody of the vehicle, thereby forming an integral drain for the fuel tank assembly 10.

Figure 3:
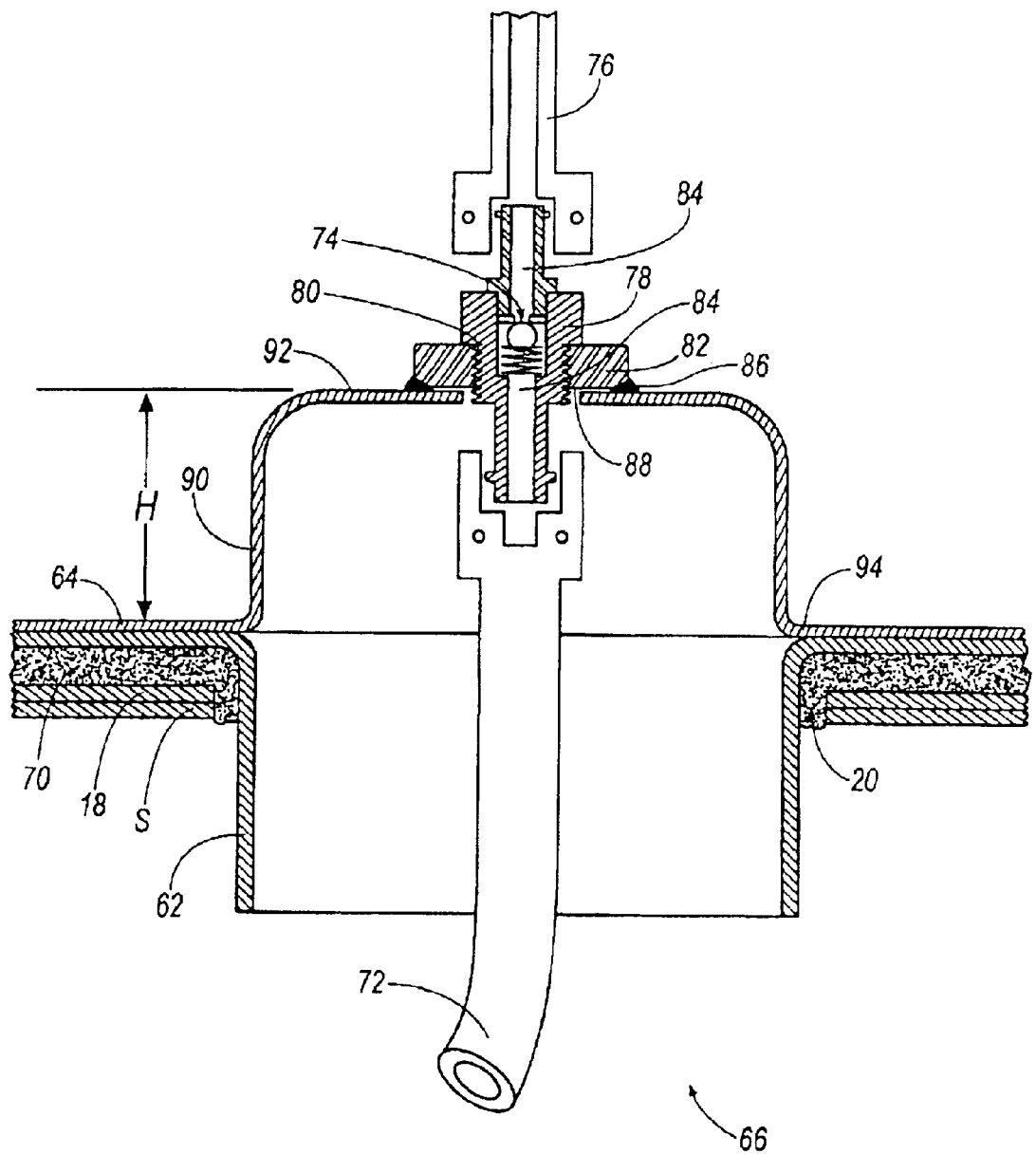
FIG. 3 is an enlarged cross-sectional view of the fuel tank assembly according to FIG. 2.

Referring to FIGS. 2 and 3, the fuel line interface 66 comprises at least a pump 68 within the fuel tank 12, a sealant 70, and a fuel line 72. The sealant 70 may comprise any desirable material, such as rubber, that is intermediately located between the enclosure 62 and the bottom portion 18 about the fuel feed passage 20 so that moisture from the exterior, E, may not enter the interior, I. The fuel line 72 is illustrated to run underneath the vehicle for supplying fuel to the engine.

Referring specifically to FIG. 3, which is referenced from a dashed line, M, in FIG. 2, the fuel line interface 66 may further comprise an integral forward flow check valve 74. In operation, the forward flow check valve 74 prevents inadvertent liquid drainage from the fuel tank 12 if separation of the fuel line 72 or integrity degradation of the fuel tank 12 were to occur. In operation, the forward flow check valve arrangement 74 opens to fuel flow at elevated pressures causes by the fuel pump 68. As illustrated, the fuel line 72 and a quick connect supply line 76 are intermediately connected by the forward flow check valve arrangement 74 that comprises a body 78 with sealing threads 80, a threaded weld nut 82, and fuel line connections 84. The fuel line connections 84 may be any desirable connecting element, such as a quick connect, a push-on type, or threaded fastener type. The forward flow check valve arrangement 74 pierces the outer surface 64 of the fuel tank and may be sealed by a weld 86 about a bottom perimeter 88 of the threaded weld nut 82.

The weld nut 82 is located over a fuel line protection means, such as a recessed boss 90, that elevates (i.e. indents) the outer surface 64 of the fuel tank 12 about the forward flow check valve arrangement 74 at a height, H. In operation, the recessed boss 90 firstly provides a flat surface 92 that permits the weld nut 82 to sit adjacently flush with the outer surface 64 in order to permit increased sealing characteristics. Secondly, the recessed boss 90 positions the forward flow check valve arrangement 74 off a normal bottom 94 of the fuel tank 12 and thereby prevents the fuel line 72 or the forward flow check valve arrangement 74 extending from the fuel feed passage 20 from snapping or breaking. Thirdly, because the recessed boss 90 is distanced at the height, H, the recessed boss 90 protects the forward flow check valve arrangement 74 from water ingress, or other contaminates that attempt to enter and corrode the fuel tank assembly 10 about the fuel passage 20.

Accordingly, as described above, the fuel tank assembly described above provides blind installation means, fuel tank rigidifying and liquid loss drainage means, and fuel line protection means, means for maintaining the fuel tank, and means for retaining the fuel tank. Essentially, the fuel tank assembly does not hinder operator access for installation and service of the fuel tank by permitting an operator to removably attach retention straps from the cradle. Even further, because the fuel tank assembly is an add-on structure that is not integral with the material of the trunk, the fuel tank may be located at any desirable location within the trunk.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A trunk mounted fuel tank assembly, comprising:
   a cradle including a back portion and a bottom portion, wherein the bottom portion includes a fuel feed passage that is placed over and aligned with a correspondingly sized passage in a surface of a trunk;
   a fuel tank including a fuel line, wherein the fuel line extends through the fuel feed passage and the passage in the surface of the trunk; and
   at least one retention strap including a first leg and a second leg, wherein said second leg engages a top portion of the fuel tank for retaining the fuel tank to the cradle.

2. The trunk mounted fuel tank assembly of claim 1, wherein the cradle includes a first flange that extends from the back portion that permits fastening of the cradle to the surface of the trunk by a first fastener, wherein the cradle includes a second flange that extends from the bottom portion of the cradle and includes a second fastener passage.

3. The trunk mounted fuel tank assembly of claim 2, wherein the second leg is connected to the back portion of the cradle, wherein the first leg includes a first fastener passage that permits a second fastener passage to extend through the first and second fastener passages that connect the at least one retention strap to the cradle and surface of the trunk.

4. The trunk mounted fuel tank assembly of claim 3, wherein the first and second fasteners are bolts.

5. The trunk mounted fuel tank assembly of claim 1, wherein the second leg includes a t-shaped section that matingly cooperates with a second leg reception passage located on the back portion of the cradle.

6. The trunk mounted fuel tank assembly of claim 5, wherein the t-shaped section includes a head portion and a neck portion that cooperates with a mouth portion and a throat portion of the second leg reception passage, respectively, wherein the neck portion and the throat portion have a smaller width than the head portion and the mouth portion.

7. The trunk mounted fuel tank assembly of claim 2, wherein the first flange includes a key passage and an integral wedge portion.

8. The trunk mourned fuel tank assembly of claim 7, wherein the first fastener is a welded stud including a key portion and a wedge-receiving portion that extends from the surface of the trunk matingly extends through the key passage during a blind installation of the cradle, wherein the wedge-receiving portion guides the stud about a channel of the key passage that extends through the wedge portion.

9. The trunk mounted fuel tank assembly of claim 1, wherein the fuel tank includes an enclosure that encapsulates an outer surface of the fuel tank, wherein the enclosure terminates near a fuel line interface, wherein the fuel line interface extends through the surface of the trunk and out to an underbody of the vehicle.

10. The trunk mounted fuel tank assembly of claim 9, wherein the enclosure comprises a blow-molded high density polyethylene that conforms to the outer surface of the fuel tank.

11. A trunk mounted fuel tank assembly, comprising:
   a cradle including a back portion and a bottom portion, wherein the bottom portion includes a fuel feed passage that is placed over a passage in a surface of a trunk;
   a fuel tank including a fuel line, wherein the fuel line extends through the fuel feed passage and the passage in the surface of the trunk;
   at least one retention strap including a first leg and a second leg, wherein said second leg engages a to portion of the fuel tank for retaining the fuel to the cradle;
   wherein the fuel tank includes an enclosure that encapsulates an outer surface of the fuel tank, wherein the enclosure terminates near a fuel line interface, wherein the fuel line interface extends through the surface of the trunk and out to an underbody of the vehicle; and
   wherein the fuel line interface includes at least a pump within the fuel tank, a sealant, and a fuel line.

12. The trunk mounted fuel tank assembly of claim 11, wherein the sealant is intermediately located between the enclosure and the bottom portion about the fuel feed passage, wherein the sealant comprises rubber.

13. The trunk mounted fuel tank assembly of claim 9, wherein the fuel line interface includes forward flow check valve arrangement, wherein the fuel line and a quick connect supply line are intermediately connected by the forward flow check valve arrangement that comprises a body with sealing threads, a threaded weld nut, and fuel line connections, wherein the forward flow check valve arrangement pierces the outer surface of the fuel tank and is sealed by a weld about a bottom perimeter of the threaded weld nut.

14. The trunk mounted fuel tank assembly of claim 13, wherein the weld nut is located over a recessed boss that elevates the outer surface of the fuel tank about the forward flow check valve arrangement at a height.

15. The trunk mounted fuel rank assembly of claim 1, wherein the cradle and at least one retention strap comprise stamped steel.

16. A trunk mounted fuel tank assembly, comprising:
   a cradle including a back portion and a bottom portion with a fuel feed passage that is placed over a surface of a trunk, wherein the cradle includes a first flange including a key passage and an integral wedge portion that extends from the back portion of the cradle and permits fastening of the cradle to the surface of the trunk by a welded stud including a key portion and wedge-receiving portion that extends from the surface of the trunk, wherein the wedge-receiving portion guides the stud about a channel of the key passage that extends through the wedge portion, wherein the cradle includes a second flange that extends from the bottom portion of the cradle and includes a first fastener passage;
   a fuel tank including a fuel line that is placed about the back portion and bottom portion of the cradle, wherein the fuel line extends through the fuel feed passage and a passage in the surface of the trunk, wherein the fuel tank includes an enclosure comprising a blow-molded high-density polyethylene that conforms to an encapsulates an outer surface of the fuel tank, wherein the enclosure terminates near a fuel line interface that extends through the surface of the trunk and out to an underbody of the vehicle; and
   at least one retention strap including a first leg and a second leg that is placed over a top portion of the fuel tank for retaining the fuel tank to the cradle, wherein the second leg is connected to the back portion of the cradle, wherein the first leg includes a second fastener passage that permits a bolt to extend through the first and second fastener passage that connects the at least one retention strap to the cradle and surface of the trunk, wherein the cradle and at least one retention strap comprises stamped steel.

17. The trunk mounted fuel tank assembly of claim 16, wherein the second leg includes a t-shaped section that matingly cooperates with a second leg reception passage located on the back portion, wherein the t-shaped section includes a head portion and a neck portion that cooperates with a mouth portion and throat portion of the second leg reception passage, respectively, wherein the neck portion and the throat portion have a smaller width than the head portion and the mouth portion.

18. The trunk mounted fuel tank assembly of claim 16, wherein the fuel line interface includes at least a pump within the fuel tank, a sealant, and a fuel line, wherein the sealant is intermediately located between the enclosure and the bottom portion about the fuel feed passage, wherein the sealant comprises rubber.

19. The trunk mounted fuel tank assembly of claim 16, wherein the fuel line interface includes an integral forward flow check valve arrangement, wherein the fuel line and a quick connect supply line are intermediately connected by the forward flow check valve arrangement that comprises
- a body with sealing threads,
- a threaded weld nut, and
- fuel line connections, wherein the forward flow check valve arrangement pierces the outer surface of the fuel tank and is sealed by a weld about a bottom perimeter of the threaded weld nut, wherein the weld nut is located over a recessed boss that elevates the outer surface of the fuel tank about the forward flow check valve arrangement at a height.

20. A trunk mounted fuel tank assembly, comprising:
- a cradle including a back portion and a bottom portion, wherein the bottom portion includes a fuel feed passage that is placed over a passage in a surface of a trunk;
- a fuel tank including a fuel line, wherein the fuel line extends through the fuel feed passage and the passage in the surface of the trunk;
- at least one retention strap including a first leg and a second leg, wherein said second leg engages a top portion of the fuel tank for retaining the fuel tank to the cradle;
- wherein the cradle includes a first flange that extends from the back portion that permits fastening of the cradle to the surface of the trunk by a first fastener, wherein the cradle includes a second flange that extends from the bottom portion of the cradle and includes a second fastener passage; and
- wherein the second leg is connected to the back portion of the cradle, wherein the first leg includes a first fastener passage that permits a second fastener passage to extend through the first and second fastener passages that connect the at least one retention strap to the cradle and surface of the trunk.

21. The trunk mounted fuel tank assembly of claim 20, wherein the first and second fasteners are bolts.

22. A trunk mounted fuel tank assembly, comprising:
- a cradle including a back portion and a bottom portion, wherein the bottom portion includes a fuel feed passage that is placed over a passage in a surface of a trunk;
- a fuel tank including a fuel line, wherein the fuel line extends through the fuel feed passage and the passage in the surface of the trunk;
- at least one retention strap including a first leg and a second leg, wherein said second leg engages a top portion of the fuel tank for retaining the fuel tank to the cradle;
- wherein the fuel tank includes an enclosure that encapsulates an outer surface of the fuel tank, wherein the enclosure terminates near a fuel line interface, wherein the fuel line interface extends through the surface of the trunk and out to an underbody of the vehicle; and
- wherein the fuel line interface includes a forward flow check valve arrangement, wherein the fuel line and a quick connect supply line are intermediately connected by the forward flow check valve arrangement that comprises a body with sealing threads, a threaded weld nut, and fuel line connections, wherein the forward flow check valve arrangement pierces the outer surface of the fuel tank and is sealed by a weld about a bottom perimeter of the threaded weld nut.

23. The trunk mounted fuel tank assembly of claim 22, wherein the weld nut is located over a recessed boss that elevates the outer surface of the fuel tank about the forward flow check valve arrangement at a height.

* * * * *